US011498267B2

(12) United States Patent
Dubelman et al.

(10) Patent No.: US 11,498,267 B2
(45) Date of Patent: Nov. 15, 2022

(54) MULTI-MATERIAL ADDITIVE MANUFACTURING APPARATUS AND METHOD

(71) Applicant: General Electric Company, Schenectady, NY (US)

(72) Inventors: Meredith Elissa Dubelman, Liberty Township, OH (US); Christopher Barnhill, Cincinnati, OH (US); Xi Yang, West Chester, OH (US); Mary Kathryn Thompson, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 160 days.

(21) Appl. No.: 16/560,479

(22) Filed: Sep. 4, 2019

(65) Prior Publication Data

US 2020/0198224 A1 Jun. 25, 2020

Related U.S. Application Data

(60) Provisional application No. 62/783,809, filed on Dec. 21, 2018.

(51) Int. Cl.
*B29C 64/129* (2017.01)
*B29C 64/245* (2017.01)
(Continued)

(52) U.S. Cl.
CPC .......... *B29C 64/129* (2017.08); *B29C 64/241* (2017.08); *B29C 64/245* (2017.08);
(Continued)

(58) Field of Classification Search
CPC ............................ B29C 64/147; B29C 64/245
See application file for complete search history.

(56) References Cited

U.S. PATENT DOCUMENTS 5,126,529 A 6/1992 Weiss et al.
6,575,218 B1 6/2003 Burns et al.
(Continued)

FOREIGN PATENT DOCUMENTS

CN 104708818 A 6/2015
CN 105729812 A 7/2016
(Continued)

OTHER PUBLICATIONS

Park et al., Development of Multi-Material DLP 3D Printer, J. Korean Soc. of Manufacturing Technology Engineers, Feb. 15, 2017, pp. 100-107 vol. 26, No. 1 (2017) Seoul, Korea.
(Continued)

*Primary Examiner* — Timothy Kennedy
(74) *Attorney, Agent, or Firm* — Dinsmore & Shohl LLP (57) ABSTRACT

A method for producing a component layer-by-layer includes: providing two or more resin handling assemblies, each including a resin support which has at least a portion which is transparent, each resin support defining a build surface located in a build zone of the respective assembly; executing a build cycle, including: depositing on each build surface radiant-energy-curable resin, the resin on each build surface being a unique material combination; positioning a stage relative to one of the build surfaces to define a layer increment; selectively curing the resin using applied radiant energy so as to define a cross-sectional layer of the component; separating the component from the build surface; cleaning at least one of the component and the stage; and repeating the cycle, for a plurality of layers, wherein at least one of the layers is cured in each of the build zone. Apparatus is described for carrying out the method.

19 Claims, 9 Drawing Sheets

(51) Int. Cl.
    *B29C 64/35*         (2017.01)
    *B29C 64/264*      (2017.01)
    *B29C 64/241*      (2017.01)
    *B33Y 40/00*        (2020.01)
    *B33Y 10/00*        (2015.01)
    *B33Y 30/00*        (2015.01)

(52) U.S. Cl.
    CPC ............ *B29C 64/264* (2017.08); *B29C 64/35*
    (2017.08); *B33Y 10/00* (2014.12); *B33Y 30/00*
    (2014.12); *B33Y 40/00* (2014.12)

(56) References Cited

U.S. PATENT DOCUMENTS

| | | | |
|---|---|---|---|
| 7,572,403 B2 | 8/2009 | Gu et al. | |
| 7,706,910 B2 | 4/2010 | Hull et al. | |
| 8,801,418 B2 | 8/2014 | El-Siblani et al. | |
| 9,031,680 B2 | 5/2015 | Napadensky | |
| 9,533,450 B2 | 1/2017 | El-Siblani et al. | |
| 9,561,623 B2 | 2/2017 | El-Siblani et al. | |
| 9,827,713 B1* | 11/2017 | Linnell | B29C 64/124 |
| 9,862,146 B2 | 1/2018 | Driessen et al. | |
| 9,901,983 B2 | 2/2018 | Hovel et al. | |
| 9,919,474 B2 | 3/2018 | Napadensky | |
| 2004/0060683 A1 | 4/2004 | Sercombe et al. | |
| 2006/0022379 A1 | 2/2006 | Wicker et al. | |
| 2008/0042321 A1 | 2/2008 | Russell et al. | |
| 2009/0130449 A1* | 5/2009 | El-Siblani | B33Y 70/00 |
| | | | 428/409 |
| 2012/0195994 A1 | 8/2012 | El-Siblani et al. | |
| 2012/0328726 A1* | 12/2012 | Zenere | B29C 64/135 |
| | | | 425/174.4 |
| 2013/0186514 A1 | 7/2013 | Zhuang et al. | |
| 2014/0319735 A1 | 10/2014 | El-Siblani et al. | |
| 2014/0322374 A1 | 10/2014 | El-Siblani et al. | |
| 2015/0131074 A1* | 5/2015 | Ebert | B29C 64/188 |
| | | | 355/77 |
| 2015/0165695 A1 | 6/2015 | Chen et al. | |
| 2016/0059485 A1 | 3/2016 | Ding et al. | |
| 2016/0332386 A1 | 11/2016 | Kuijpers | |
| 2017/0072635 A1 | 3/2017 | El-Siblani et al. | |
| 2017/0100899 A1 | 4/2017 | El-Siblani et al. | |
| 2017/0348913 A1 | 12/2017 | Lin et al. | |
| 2018/0229436 A1 | 8/2018 | Gu et al. | |
| 2018/0243982 A1* | 8/2018 | Shanjani | B29C 64/135 |
| 2018/0272608 A1 | 9/2018 | Yun | |
| 2019/0070793 A1* | 3/2019 | Pang | B29C 64/357 |
| 2020/0094469 A1* | 3/2020 | Holt | B29C 64/124 |

FOREIGN PATENT DOCUMENTS

| | | | |
|---|---|---|---|
| JP | 05318606 A | * | 12/1993 |
| KR | 20180125801 A | | 11/2018 |
| TW | 201713489 A | | 4/2017 |
| WO | 2018/122712 A1 | | 7/2018 |

OTHER PUBLICATIONS

Japanese office action for application 2019-230638 dated Mar. 12, 2021 (7 pages with English Translation).
European Extended Search Report issued in connection with related EP Application No. 19214845.0 dated May 28, 2020.
Chinese office action for application 201911319038.4 dated Jul. 30, 2021 (24 pages with English Translation).
Chinese office action for application 201911319038.4 dated Mar. 1, 2022 (19 pages with English Translation).
European office action for application 19214845.0 dated Mar. 2, 2022.

* cited by examiner

MULTI-MATERIAL ADDITIVE MANUFACTURING APPARATUS AND METHOD

BACKGROUND OF THE INVENTION

This invention relates generally to additive manufacturing, and more particularly to methods for additive manufacturing of components having multiple materials.

Additive manufacturing is a process in which material is built up layer-by-layer to form a component. Stereolithography is a type of additive manufacturing process which employs a tank of liquid radiant-energy curable photopolymer "resin" and a curing energy source such as a laser. Similarly, DLP 3D printing employs a two-dimensional image projector to build components one layer at a time. For each layer, the projector flashes a radiation image of the cross-section of the component on the surface of the liquid or through a transparent object which defines a constrained surface of the resin. Exposure to the radiation cures and solidifies the pattern in the resin and joins it to a previously-cured layer. Other types of additive manufacturing processes utilize other types of radiant energy sources to solidify patterns in resin.

Another prior art method is a so-called "tape casting" process. In this process, a resin is deposited onto a flexible radiotransparent tape that is fed out from a supply reel. An upper plate lowers on to the resin, compressing it between the tape and the upper plate and defining a layer thickness. Radiant energy is used to cure the resin through the radiotransparent tape. Once the curing of the first layer is complete, the upper plate is retracted upwards, taking the cured material with it. The tape is then advanced to expose a fresh clean section, ready for additional resin.

One problem with existing additive manufacturing processes is that it is difficult or impossible to produce components having multiple materials in different layers.

BRIEF DESCRIPTION OF THE INVENTION

At least one of these problems is addressed by an additive manufacturing method in which multiple resin handling assemblies are provided containing different material combinations, permitting layer-by-layer multi-material structures.

According to one aspect of the technology described herein, a method for producing a component layer-by-layer includes: providing two or more resin handling assemblies, each resin handling assembly including a resin support at least a portion of which is transparent, wherein each resin support defines a build surface located in a build zone of the respective resin handling assembly; executing a build cycle, including the steps of: depositing on each build surface resin which is radiant-energy-curable, wherein the resin on each build surface is a unique material combination; positioning a stage relative to a selected one of the build surfaces so as to define a layer increment in the resin on the selected build surface; selectively curing the resin on the selected build surface using an application of radiant energy in a specific pattern so as to define the geometry of a cross-sectional layer of the component; moving the selected build surface and the stage relatively apart so as to separate the component from the selected build surface; cleaning at least one of the component and the stage; and repeating the cycle, for a plurality of layers, wherein at least one of the layers is cured in each of the build zones, until the component is complete.

According to another aspect of the technology described herein, an additive manufacturing apparatus includes: at least two resin handling assemblies, each resin handling assembly including a resin support which has at least a portion which is transparent, wherein each resin support defines a build surface which is located in a build zone of the respective resin handling assembly; a cleaning tank containing a cleaning fluid; a stage positioned adjacent the build zone and configured to hold a stacked arrangement of one or more cured layers of a radiant-energy-curable resin; one or more actuators operable to manipulate a relative position of the build surface and the stage; a shifting mechanism operable to change the relative positions of the stage, the resin handling assemblies, and the cleaning tank; and a radiant energy apparatus positioned adjacent to the build zone opposite to the stage, and operable to generate and project radiant energy through the floor in a predetermined pattern.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
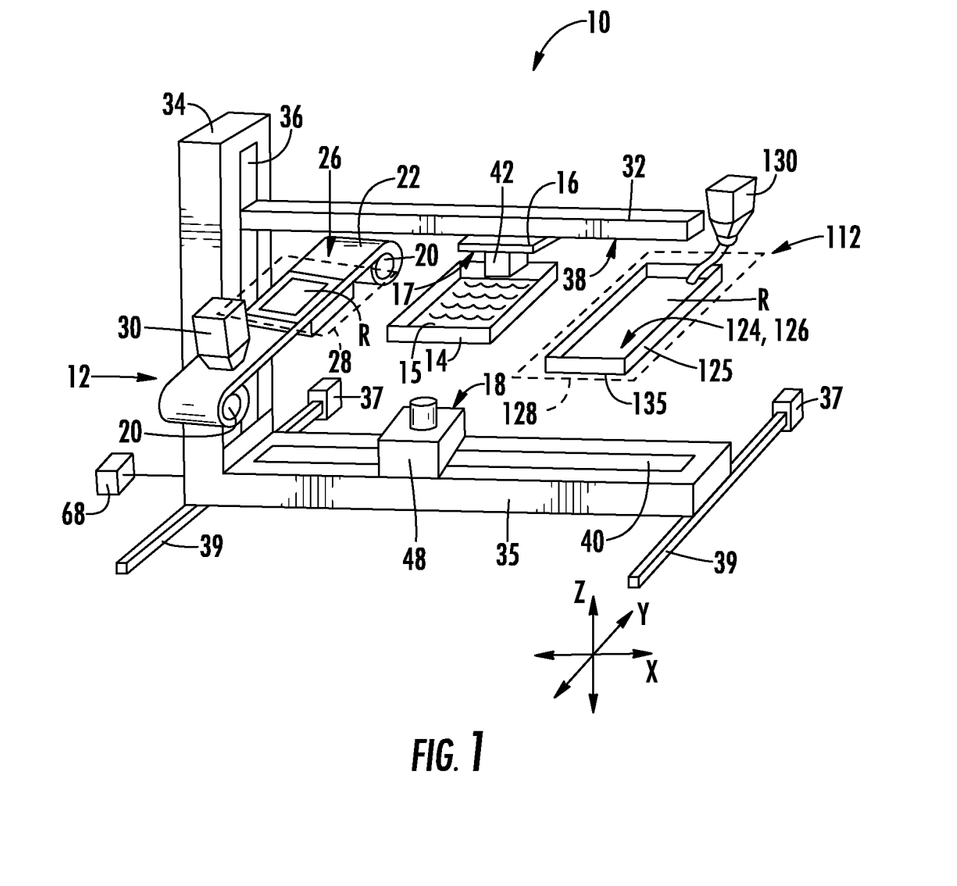
FIG. 1 is a schematic perspective view of an exemplary additive manufacturing apparatus.

Referring to the drawings wherein identical reference numerals denote the same elements throughout the various views, FIG. 1 illustrates schematically an example of one type of suitable apparatus 10 for carrying out an embodiment of an additive manufacturing method as described herein.

The method provides for the use of a plurality of resin handling assemblies incorporating resin supports (e.g., foils, tapes, plates, tanks, vats, etc.) for sequential use with the apparatus 10. As a result, multiple layers can be made such that sequential layers can be made with different resins.

The method is adaptable for use with lower viscosity resins, slurries, and pastes, as well as higher viscosity resins and/or powders. It will be understood that other configurations of equipment may be used to carry out the method. Basic components of the exemplary apparatus 10 include two or more resin handling assemblies 12, 112, a cleaning tank 14, a stage 16, and a radiant energy apparatus 18.

In the example illustrated in FIG. 1, the apparatus includes first and second resin handling assemblies 12, 112 respectively. It will be understood that the apparatus 10 could include any number of resin handling assemblies, and that each of those resin handling assemblies could be of any type or configuration which provides a resin support having a transparent build surface suitable for holding a layer of radiant-energy-curable resin, as described in detail below. In the illustrated example, the first resin handling assembly 12 is a "tape casting"-type device, and the second resin handling assembly 112 is a tank-type device. However, this particular combination is merely to illustrate the variation possible. Alternatively, the first and second resin handling assemblies 12, 112 could both be "tape casting" devices, or the first and second resin handling assemblies 12, 112 could both be tank-type devices.

The first resin handling assembly 12 includes spaced-apart rollers 20 with a flexible polymeric tape or foil 22 extending therebetween. A portion of the foil 22 is supported from underneath by a support plate 24. Suitable mechanical supports (frames, brackets, etc.—not shown) would be provided for the rollers 20 and support plate 24. The foil 22 is an example of a "resin support".

Both of the support plate and the foil 22 are transparent or include a portion or portions that are transparent. As used herein, the term "transparent" refers to a material which allows radiant energy of a selected wavelength to pass through. For example, as described below, the radiant energy used for curing could be ultraviolet light or laser light in the visible spectrum. Non-limiting examples of transparent materials include polymers, glass, and crystalline minerals such as sapphire or quartz.

Appropriate means such as motors, actuators, feedback sensors, and/or controls of a known type (not shown) would be provided for driving the rollers 20 in such a manner so as to maintain the foil 22 tensioned between the rollers 20 and to wind the foil 22 from one of the rollers 20 to the other roller 20.

The foil 22 extending between the rollers 20 defines a first "build surface" 26 which is shown as being planar, but could alternatively be arcuate (depending on the shape of the support plate). For purposes of convenient description, the first build surface 26 may be considered to be oriented parallel to an X-Y plane of the apparatus 10, and a direction perpendicular to the X-Y plane is denoted as a Z-direction (X, Y, and Z being three mutually perpendicular directions).

The first build surface 26 may be configured to be "non-stick", that is, resistant to adhesion of cured resin. The non-stick properties may be embodied by a combination of variables such as the chemistry of the foil 22, its surface finish, and/or applied coatings. In one example, a permanent or semi-permanent non-stick coating may be applied. One non-limiting example of a suitable coating is polytetrafluoroethylene ("PTFE"). In one example, all or a portion of the first build surface 26 may incorporate a controlled roughness or surface texture (e.g. protrusions, dimples, grooves, ridges, etc.) with nonstick properties. In one example, the foil 22 may be made in whole or in part from an oxygen-permeable material.

For reference purposes, an area or volume immediately surrounding the location of the foil 22 is defined as a first "build zone", labeled 28.

Some means are provided for applying or depositing resin R to the first build surface 26 in a generally uniform layer. FIG. 1 shows schematically a material depositor 30 which would be understood to include a reservoir for material communicating with the material outlet such as a slot or aperture (not shown). Conventional means such as a doctor blade (not shown) may be used to control the thickness of resin R applied to the foil 22, as the foil 22 passes under the material depositor 30.

The second resin handling assembly 112 includes a tank 122 supported in an appropriate position within the apparatus 10. Suitable mechanical supports (frames, brackets, etc.—not shown) would be provided for the tank 122. The tank 122 is another example of a "resin support".

The tank includes a floor 124 and perimeter walls 125 such that the tank 122 is configured to receive a radiant-energy-curable resin R. The floor 124 is transparent or includes a portion or portions that are transparent, as that term is defined above. Non-limiting examples of transparent materials include polymers, glass, and crystalline minerals such as sapphire or quartz. The floor 124 could be made up of two or more subcomponents, some of which are transparent. In an alternant embodiment, where relatively more viscous resin R is used, the perimeter walls 125 could be eliminated, leaving just the floor 124 (i.e., essentially a plate).

The floor 124 defines a second build surface 126 which may be planar. For purposes of convenient description, the second build surface 126 may be considered to be oriented parallel to an X-Y plane of the apparatus 10

The second build surface 126 may be configured to be "non-stick", that is, resistant to adhesion of cured resin. The non-stick properties may be embodied by a combination of variables such as the chemistry of the floor 124, its surface finish, and/or applied coatings. In one example, a permanent or semi-permanent non-stick coating may be applied. One non-limiting example of a suitable coating is polytetrafluoroethylene ("PTFE"). In one example, all or a portion of the second build surface 126 may incorporate a controlled roughness or surface texture (e.g. protrusions, dimples, grooves, ridges, etc.) with nonstick properties. In one example, the floor 124 may be made in whole or in part from an oxygen-permeable material.

For reference purposes, an area or volume immediately surrounding the location of the tank 122 is defined as a second "build zone", labeled 128.

Some means may be provided for applying or depositing resin R to the second build surface 126 in a generally uniform layer. FIG. 1 shows schematically a material depositor 130 which would be understood to include a reservoir for material communicating with a material outlet positioned to discharge resin into the tank 122.

Alternatively, tank 122 could be arranged to be prepared and filled with resin R at a location outside of the second build zone 128, then transported into the second build zone 128 for the build process described below, and subsequently transported out of the build zone for cleaning and refilling. The particular process or mechanism or process used to fill, clean, or otherwise prepare the tank 122 is not specifically relevant to the present invention.

The stage 16 is a structure defining a planar upper surface 17 which is capable of being oriented parallel to the build surfaces 26, 126. Some means are provided for moving the stage 16 relative to the first and second resin handling assemblies 12, 112, parallel to the Z-direction. In FIG. 1, the stage 16 is mounted to a lateral beam 32 which is mounted to an upright column 34, which is in turn mounted to a laterally-extending base 35. The movement means are depicted schematically as a simple vertical actuator 36 connected between the beam 32 and the column 34, with the understanding that devices such as ballscrew electric actuators, linear electric actuators, pneumatic cylinders, hydraulic cylinders, or delta drives may be used for this purpose. In addition to, or as an alternative to, making the stage 16 movable, the foil 22 and/or the tank 122 could be movable parallel to the Z-direction. Alternately, the lateral beam 32 may be supported by a second column (not shown) so it is mechanically supported on both sides. This will help to eliminate unwanted deflection of the lateral beam 32 which could impact that performance of the system. This second column may have a second vertical actuator or a bearing assembly or a bearing surface to enable the distal end of the lateral beam 32 to follow the movement of the proximal end of the lateral beam 32. Other means of mechanical support are known in the art.

Some means are provided for moving the stage 16 laterally relative to the first and second resin handling assemblies 12, 112, e.g., at least parallel to the X-direction. This could be, for example, a simple lateral actuator 38 connected between the stage 16 and the beam 32. Devices such as ballscrew electric actuators, linear electric actuators, pneumatic cylinders, hydraulic cylinders, or delta drives may be used for this purpose. In addition to or as an alternative to movement in the X-direction, means may be provided for moving stage 16 parallel to the Y-direction. This could be, for example, actuators 37 moving the base 35 along rails 39 oriented parallel to the Y-direction. For descriptive purposes the means for moving the stage 16 in one or more lateral directions may be referred to as a "shifting mechanism".

Figure 2:
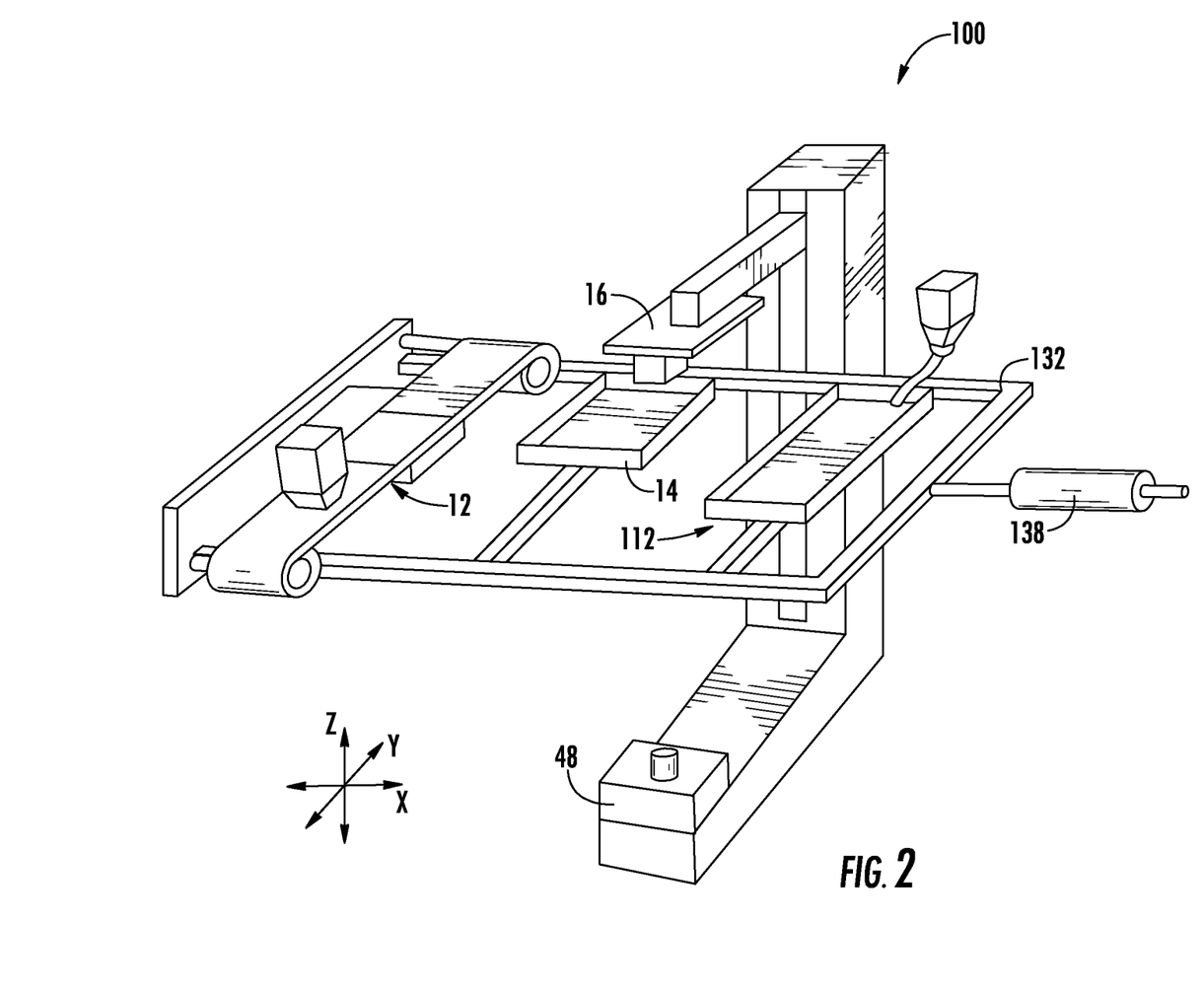
FIG. 2 is a schematic perspective view of an alternative embodiment of the apparatus of FIG. 1.

In addition to, or as an alternative to, making the stage 16 movable laterally, the first and second resin handling assemblies 12, 112 could be movable laterally, e.g., parallel to the X-direction and/or the Y-direction. For example, FIG. 2 illustrates an alternative apparatus 100 in which a radiant energy apparatus 18 and stage are fixed in the X-Y plane and first and second resin handling assemblies 12, 112 as well as a cleaning tank 14 are supported on a frame 132 which is movable laterally relative to the first stage 16 and radiant energy apparatus 18, e.g., parallel to the X-direction. Lateral movement of the frame 132 could be effectuated, for example, using a simple lateral actuator 138 connected between the frame 132 and a fixed support structure (not shown). Devices such as ballscrew electric actuators, linear electric actuators, pneumatic cylinders, hydraulic cylinders, or delta drives may be used for this purpose.

Figure 8:
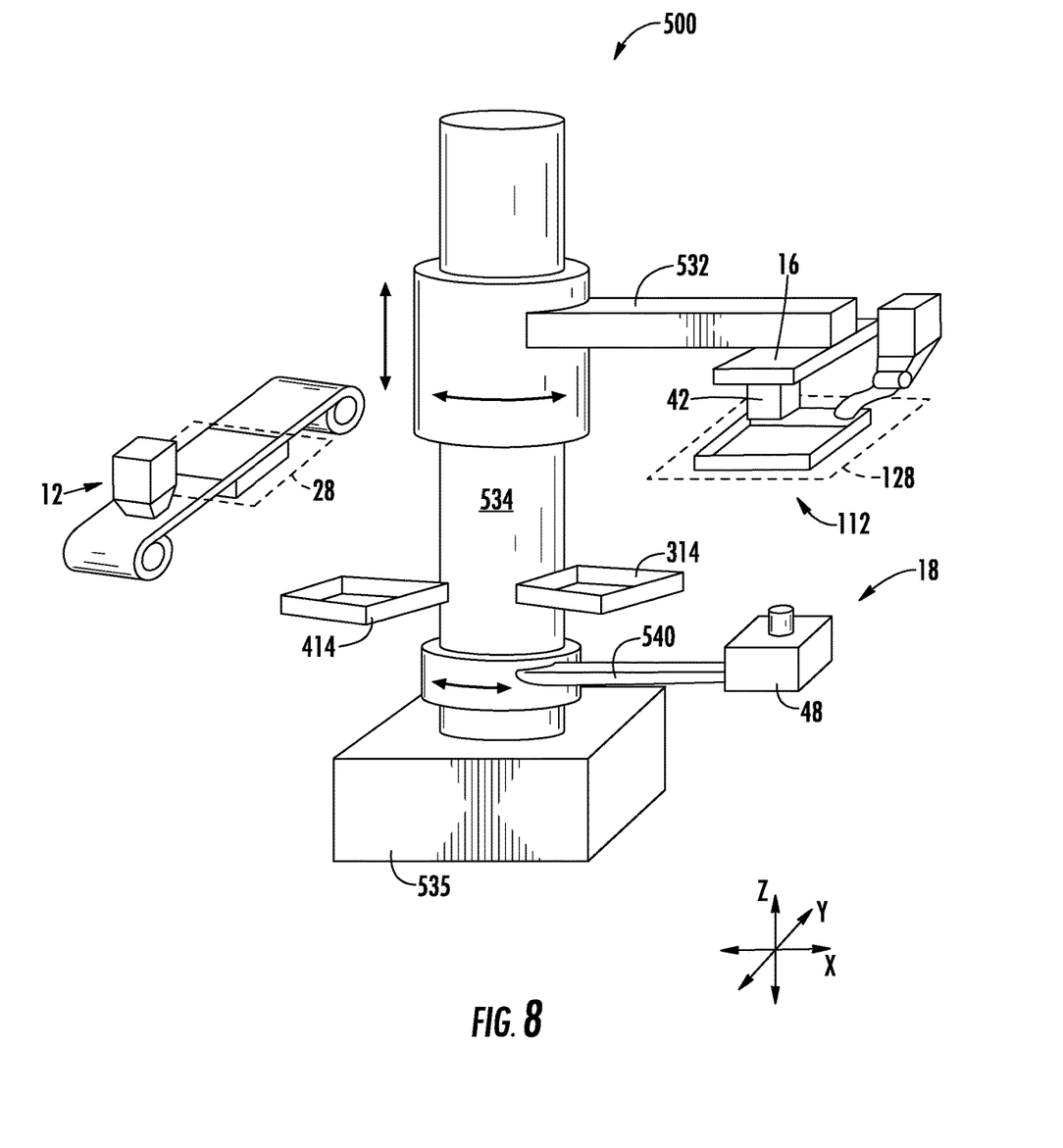
FIG. 8 is a schematic perspective view of another alternative embodiment of the apparatus of FIG. 1.

In addition to, or as an alternative to, making the stage 16 or the first and second resin handling assemblies 12, 112 translatable, e.g., movable parallel to the X-direction and/or the Y-direction, they could incorporate rotational motion. For example, FIG. 8 illustrates an alternative apparatus 500 including an upright central column 534 extending from a base 535. A lateral beam 532 extends outward from the and is mounted so that it can rotate about a central axis "A" of the column 534 and also move up or down parallel to the central axis A (e.g., parallel to the Z-direction). A lower beam 540 carries a radiant energy source 18 as described in more detail below (a projector 48 is shown in the illustrated embodiment). Appropriate actuators (not shown) may be provided to drive the rotational motion and the vertical motion of the lateral beam 532 and the lower beam 540, and optionally any motion of the stage 16 or the projector 48 relative to their respective beams. The beams 532, 540 and their respective actuators may be referred to as a "shifting mechanism".

The other elements of the apparatus 500 may be arrayed around the column 534. In the illustrated example, a first resin handling assembly 12 with an associated first build zone 28 is positioned at approximately a 9 o'clock location relative to the central column 534, and a second resin handling assembly 112 with an associated second build zone 128 is positioned at approximately a 3 o'clock location relative the central column 534. In the illustrated example, the apparatus 500 is also provided with a cleaning tank 314 and a drying tank 414, described in more detail below. Each of these additional elements of the apparatus 500 may be arrayed at any angular position and any Z-height (e.g. elevation) relative to the central column 534. Furthermore, these additional elements could be "stacked", that is, located at a common angular orientation but at different elevations. In operation, the lateral beam 532 would be moved by some combination of rotation and vertical translation as necessary to bring the stage 16 into the selected build zone 28, 128 or the selected tank 314, 414.

The radiant energy apparatus 18 may comprise any device or combination of devices operable to generate and project radiant energy on the resin R in a suitable pattern and with a suitable energy level and other operating characteristics to cure the resin R during the build process, described in more detail below.

In one exemplary embodiment as shown in FIG. 1, the radiant energy apparatus 18 may comprise a "projector" 48, used herein generally to refer to any device operable to generate a radiant energy patterned image of suitable energy level and other operating characteristics to cure the resin R. As used herein, the term "patterned image" refers to a projection of radiant energy comprising an array of individual pixels. Non-limiting examples of patterned imaged devices include a DLP projector or another digital micro-mirror device, a 2D array of LEDs, a 2D array of lasers, or optically addressed light valves. In the illustrated example, the projector 48 includes (internally, see FIG. 3) a radiant energy source 50 such as a UV lamp, an image forming apparatus 52 operable to receive a source beam 54 from the radiant energy source and generate a patterned image 56 to be projected onto the surface of the resin R, and optionally focusing optics 58, such as one or more lenses.

Figure 3:
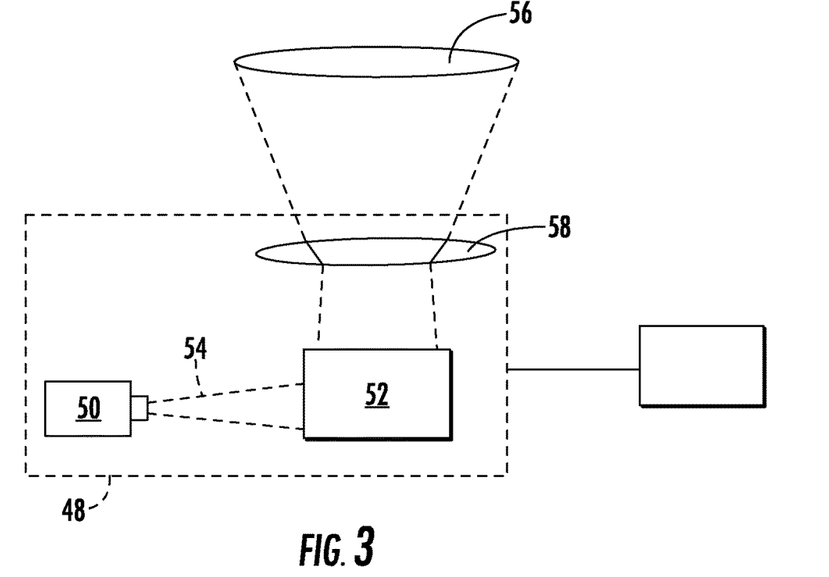
FIG. 3 is a schematic diagram of an exemplary projector apparatus.

The radiant energy source 50 may comprise any device operable to generate a beam of suitable energy level and frequency characteristics to cure the resin R. In the illustrated example, the radiant energy source comprises a UV flash lamp.

The image forming apparatus 52 may include one or more mirrors, prisms, and/or lenses and is provided with suitable actuators, and arranged so that the source beam 54 from the radiant energy source 50 can be transformed into a pixelated image in an X-Y plane coincident with the surface of the resin R. In the illustrated example, the image forming apparatus 52 may be a digital micro-mirror device. For example, the projector 48 may be a commercially-available Digital Light Processing ("DLP") projector.

As an option, the projector 48 may incorporate additional means (not shown) such as actuators, mirrors, etc. configured to selectively move the image forming apparatus or other part of the projector 48, with the effect of rastering or shifting the location of the patterned image on the respective build surface 26, 126. Stated another way, the patterned image may be moved away from a nominal or starting location. This permits a single image forming apparatus to cover a larger build area, for example. Means for mastering or shifting the patterned image from the image forming apparatus are commercially available. This type of image projection may be referred to herein as a "tiled image".

Figure 11:
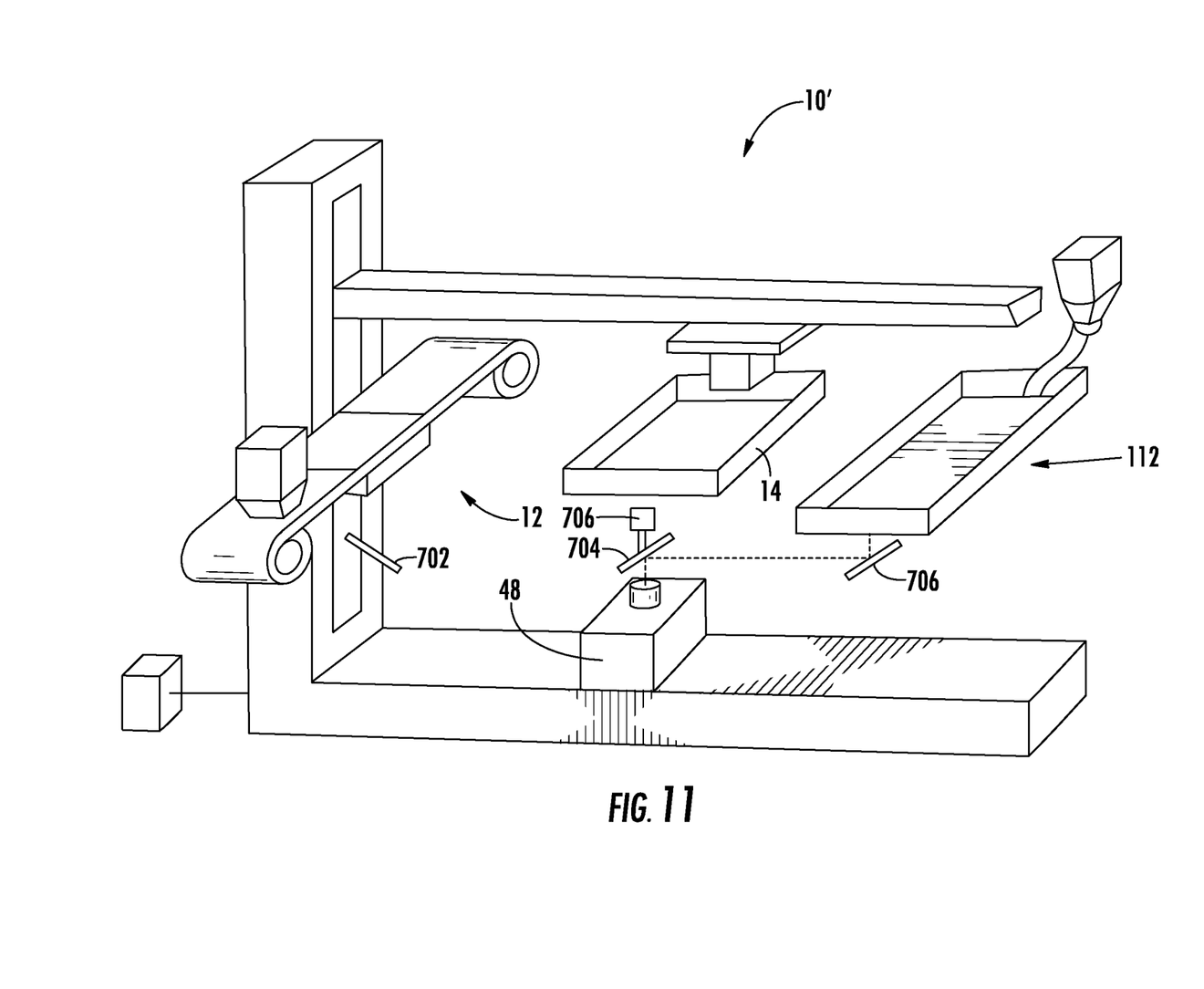
FIG. 11 is a schematic perspective view of another alternative embodiment of the apparatus of FIG. 1.

In the illustrated example, a single radiant energy apparatus 18 is provided, and some means are provided for moving the radiant energy apparatus 18 is provided between the first and second resin handling assemblies 12, 112, e.g., parallel to the X-direction. This could be, for example, a simple actuator 40 connected between the radiant energy apparatus 18 and the beam 32. Devices such as ballscrew electric actuators, linear electric actuators, pneumatic cylinders, hydraulic cylinders, or delta drives may be used for this purpose. Alternatively, a single radiant energy apparatus 18 could be provided which is static and which has a projection footprint, or range of beam sweep, sufficiently large to cover all of the resin handling assemblies 12, 112 without having to more the radiant energy apparatus 18. Optionally, one projector may serve multiple resin handling assemblies by using image shift means. For example, FIG. 11 illustrates an apparatus 10' generally similar to apparatus 10 including resin supports 12, 112 and a single, static projector 48. The apparatus 10' is further provided with image shifting means. One possible image shifting means includes fixed mirrors 700, 702 associated with each resin handling assembly 12, 112 and a moveable mirror 704 connected to an actuator 706. In the position shown in FIG. 11, the moveable mirror 704 would be in a first position directing the image from the projector 48 to the first moveable mirror 700, and thus to the resin handling assembly 112, as shown schematically by a dashed line. The moveable mirror 704 would be turned to an opposite direction using the actuator 706 in order to direct the image to the resin handling assembly 12.

Figure 4:
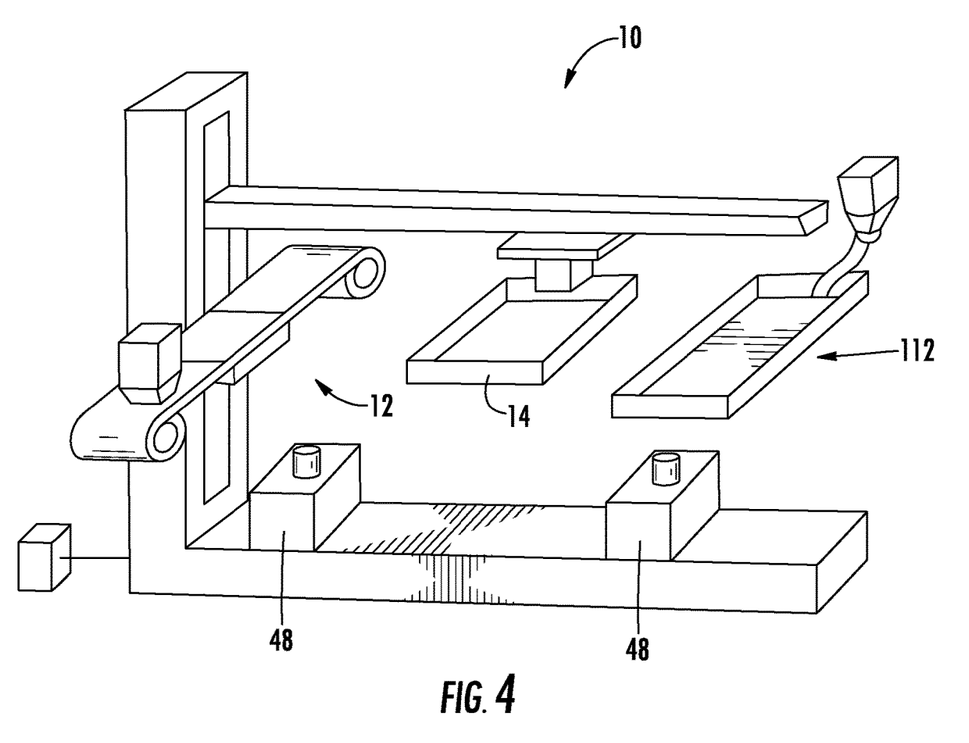
FIG. 4 is a schematic perspective view of an alternative embodiment of the apparatus of FIG. 1 which includes multiple radiant energy devices.

Alternatively, more than one radiant energy apparatus 18 could be provided. FIG. 4 shows a modification of the apparatus 10 to include one stationary projector 48 associated with each build zone 28, 128.

Figure 5:
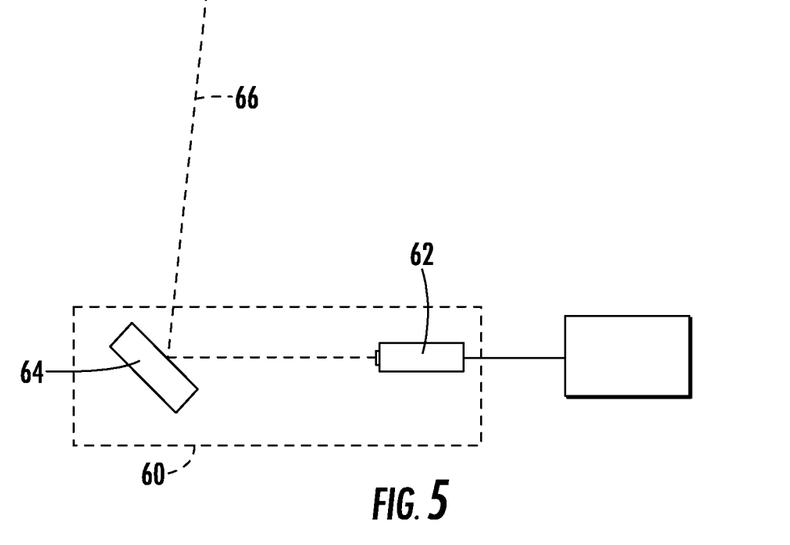
FIG. 5 is a schematic diagram of an exemplary scanned beam apparatus.

In another exemplary embodiment as shown in FIG. 5, in addition to other types of radiant energy devices, the radiant energy apparatus 18 may comprise a "scanned beam apparatus" 60 used herein to refer generally to refer to any device operable to generate a radiant energy beam of suitable energy level and other operating characteristics to cure the resin R and to scan the beam over the surface of the resin R in a desired pattern. In the illustrated example, the scanned beam apparatus 60 comprises a radiant energy source 62 and a beam steering apparatus 64.

The radiant energy source 62 may comprise any device operable to generate a beam of suitable power and other operating characteristics to cure the resin R. Non-limiting examples of suitable radiant energy sources include lasers or electron beam guns.

The beam steering apparatus 64 may include one or more mirrors, prisms, and/or lenses and may be provided with suitable actuators, and arranged so that a beam 66 from the radiant energy source 62 can be focused to a desired spot size and steered to a desired position in plane coincident with the surface of the resin. The beam 66 may be referred to herein as a "build beam". Other types of scanned beam apparatus may be used. For example, scanned beam sources using multiple build beams are known, as are scanned beam sources in which the radiant energy source itself is movable by way of one or more actuators.

The apparatus 10 may include a controller 68. The controller 68 in FIG. 1 is a generalized representation of the hardware and software required to control the operation of the apparatus 10, the resin handling assemblies 12, 112, the cleaning tank 14, the stage 16, the radiant energy apparatus 18, and the various actuators described above. The controller 68 may be embodied, for example, by software running on one or more processors embodied in one or more devices such as a programmable logic controller ("PLC") or a microcomputer. Such processors may be coupled to sensors and operating components, for example, through wired or wireless connections. The same processor or processors may be used to retrieve and analyze sensor data, for statistical analysis, and for feedback control. Numerous aspects of the apparatus 10 may be subject to closed-loop control. For example, sensors could be used to monitor position, displacement, or movement of any of the components. Sensors could be used to monitor output power or frequency characteristics of the radiant energy apparatus 18. Imaging sensors (e.g. machine vision) could be used to observe the deposition or curing process. Information from any of the sensors could be used to monitor, control, or automate some or all of the operation of the apparatus 10, in conjunction with appropriate programming of the control 68.

Optionally, the components of the apparatus 10 may be surrounded by a housing (not shown), which may be used to provide a shielding or inert gas atmosphere using gas ports. Optionally, pressure within the housing could be maintained at a desired level greater than or less than atmospheric. Optionally, the housing could be temperature and/or humidity controlled. Optionally, ventilation of the housing could be controlled based on factors such as a time interval, temperature, humidity, and/or chemical species concentration.

The resin R comprises a material which is radiant-energy curable and which is capable of adhering or binding together the filler (if used) in the cured state. As used herein, the term "radiant-energy curable" refers to any material which solidifies in response to the application of radiant energy of a particular frequency and energy level. For example, the resin R may comprise a known type of photopolymer resin containing photo-initiator compounds functioning to trigger a polymerization reaction, causing the resin to change from a liquid state to a solid state. Alternatively, the resin R may comprise a material which contains a solvent that may be evaporated out by the application of radiant energy. The uncured resin R may be provided in solid (e.g. granular) or liquid form including a paste or slurry.

Generally, the resin R should be flowable. When using the tank 122, the resin R is preferably a relatively low viscosity liquid that is self-levelling. When using the foil 22, the resin R is preferably a relatively high viscosity fluid that will not "slump" or run off during the build process. Optionally, the resin R can be a liquid having a higher viscosity such that contact with the stage 16 is required to level the resin R. Optionally, the resin R can be a liquid having a higher viscosity such that contact with a smoothing apparatus such as a doctor blade (not shown) is required to level the resin R. The composition of the resin R may be selected as desired to suit a particular application. Mixtures of different compositions may be used.

The resin R may be selected to have the ability to out-gas or burn off during further processing, such as the sintering process described below.

The resin R may incorporate a filler. The filler may be pre-mixed with resin R, then loaded into the material depositors 30, 130. The filler comprises particles, which are conventionally defined as "a very small bit of matter". The filler may comprise any material which is chemically and physically compatible with the selected resin R. The particles may be regular or irregular in shape, may be uniform or non-uniform in size, and may have variable aspect ratios. For example, the particles may take the form of powder, of small spheres or granules, or may be shaped like small rods or fibers.

The composition of the filler, including its chemistry and microstructure, may be selected as desired to suit a particular application. For example, the filler may be metallic, ceramic, polymeric, and/or organic. Other examples of potential fillers include diamond, silicon, and graphite. Mixtures of different compositions may be used. In one example, the filler composition may be selected for its electrical or electromagnetic properties, e.g. it may specifically be an electrical insulator, a dielectric material, or an electrical conductor. It may be magnetic.

The filler may be "fusible", meaning it is capable of consolidation into a mass upon via application of sufficient energy. For example, fusibility is a characteristic of many available powders including but not limited to: polymeric, ceramic, glass, and metallic.

The proportion of filler to resin R may be selected to suit a particular application. Generally, any amount of filler may be used so long as the combined material is capable of flowing and being leveled, and there is sufficient resin R to hold together the particles of the filler in the cured state.

Examples of the operation of the apparatus 10 will now be described in detail with reference to FIG. 1. It will be understood that, as a precursor to producing a component and using the apparatus 10, a component 42 is software modeled. e.g., in terms of a tool (energy source raster) path or as a stack of planar layers arrayed along the Z-axis. Depending on the type of curing method used, each layer may be divided into a grid of pixels. The actual component 42 may be modeled and/or manufactured as a stack of dozens or hundreds of layers. Suitable software modeling processes are known in the art.

Initially, the first and second build zones 28, 128 are prepared with resin R on the respective build surfaces 26, 126.

For the first build zone 28, the material depositor 30 is used to deposit resin R over the first build surface 30 of the foil 22.

For the second build zone 128, the tank is 122 is positioned and resin R deposited on the floor 124. The tank 122 may be supplied as a prefilled "cartridge" which is already filled with an appropriate amount of resin R sufficient for one layer or multiple layers. If the tank 122 is not provided as a prefilled cartridge, then the tank 122 would need to be filled with resin, for example using material depositor 130. As used herein, the term "filling" refers generally to the act of dispensing, loading, or placing resin R into the tank 122 and does not necessarily imply that the tank 122 be completely filled, or filled to maximum capacity or that the bottom of the tank is completely covered. Thus, the act of "filling" may be partial or complete.

Optionally, as a preliminary step in the filling process, a nonstick material may be applied to the build surfaces 26, 126 prior to resin application. For example, a release agent such as polyvinyl alcohol ("PVA") may be applied to the build surfaces 26, 126 prior to each layer being built. In another example, a sacrificial layer having non-stick properties may be applied. A nonstick film, e.g. a polymer sheet or film can be applied to the build surfaces 26, 126. The film can be removed after a layer is cured.

Figure 9:
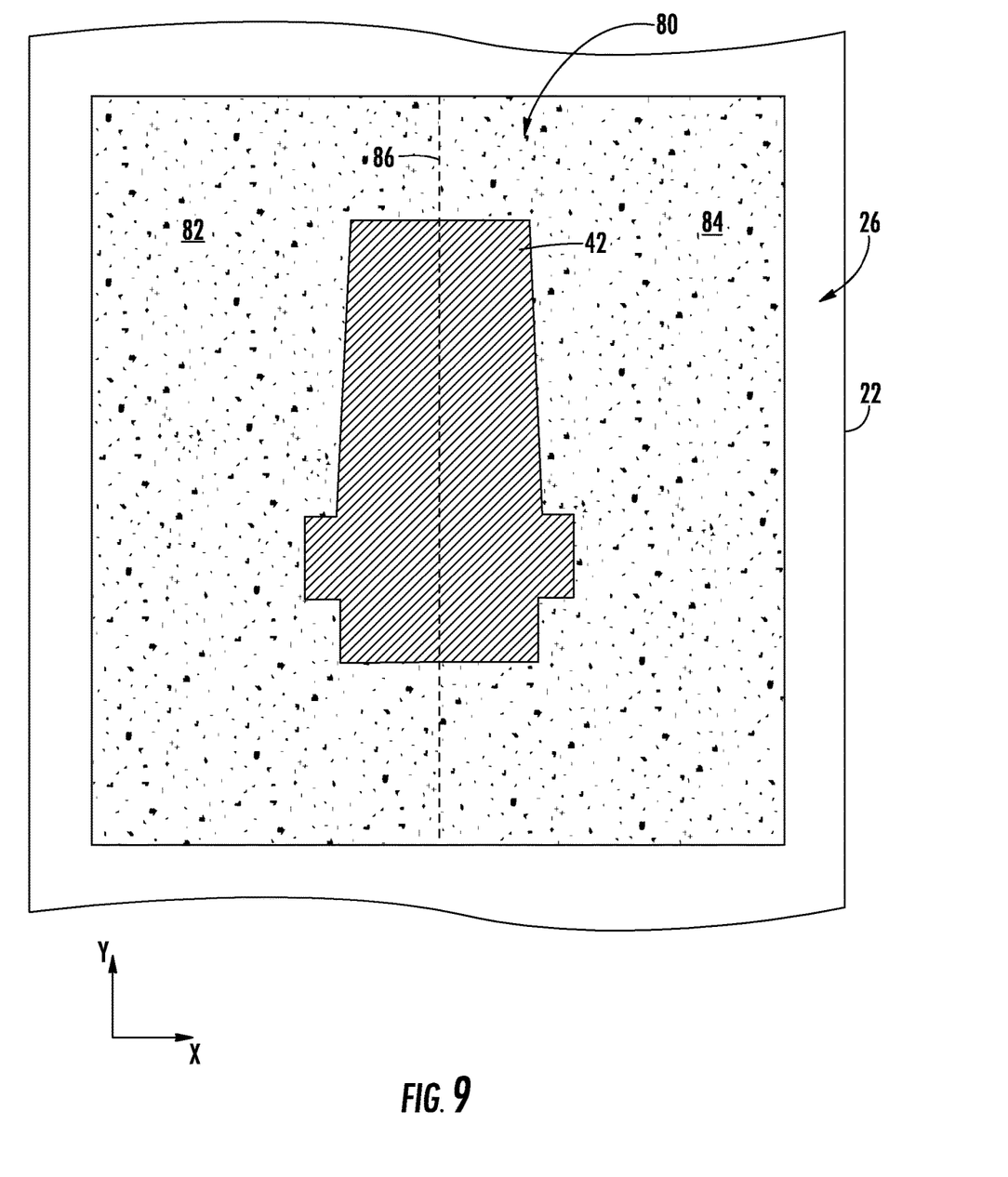
FIG. 9 is a schematic top plan view of a layer of resin being deposited on the build surface.

To facilitate building a multi-material component 42, the first and second build surfaces 26, 126 may be provided with different material combinations of resin R and/or filler. As used herein, the term "combination" refers to any difference in either of the constituents. So, for example, a particular resin composition mixed with either of two different filler compositions would represent two different material combinations. For example, the first build surface 26 may be covered with a first combination of resin R and filler, and the second build surface 126 may be covered with a different combination of resin R and filler. Stated another way, each build surface 26, 126 may be provided with a unique material combination. Different materials may also be supplied to one of the build surfaces, e.g. 26, at different times during the build. More than one material may also be supplied to different areas on a given build surface, e.g. 26, at the same time. Optionally, any of the individual layers may comprise two or more material combinations. FIG. 9 illustrates an exemplary layer 80 showing a cross-section of the component 42 superimposed thereupon. The layer 80 is divided into a first section 82 including a first combination of resin R and filler, and a second section 84 including a second combination of resin R and filler. A dashed line 86 indicates the division between the two sections 82, 84. The shape, size, and number of sections, and number of different material combinations within a given layer may be arbitrarily selected. If multiple material combinations are used in one layer, then the deposition steps described above would be carried out for each section of the layer.

Figure 10:
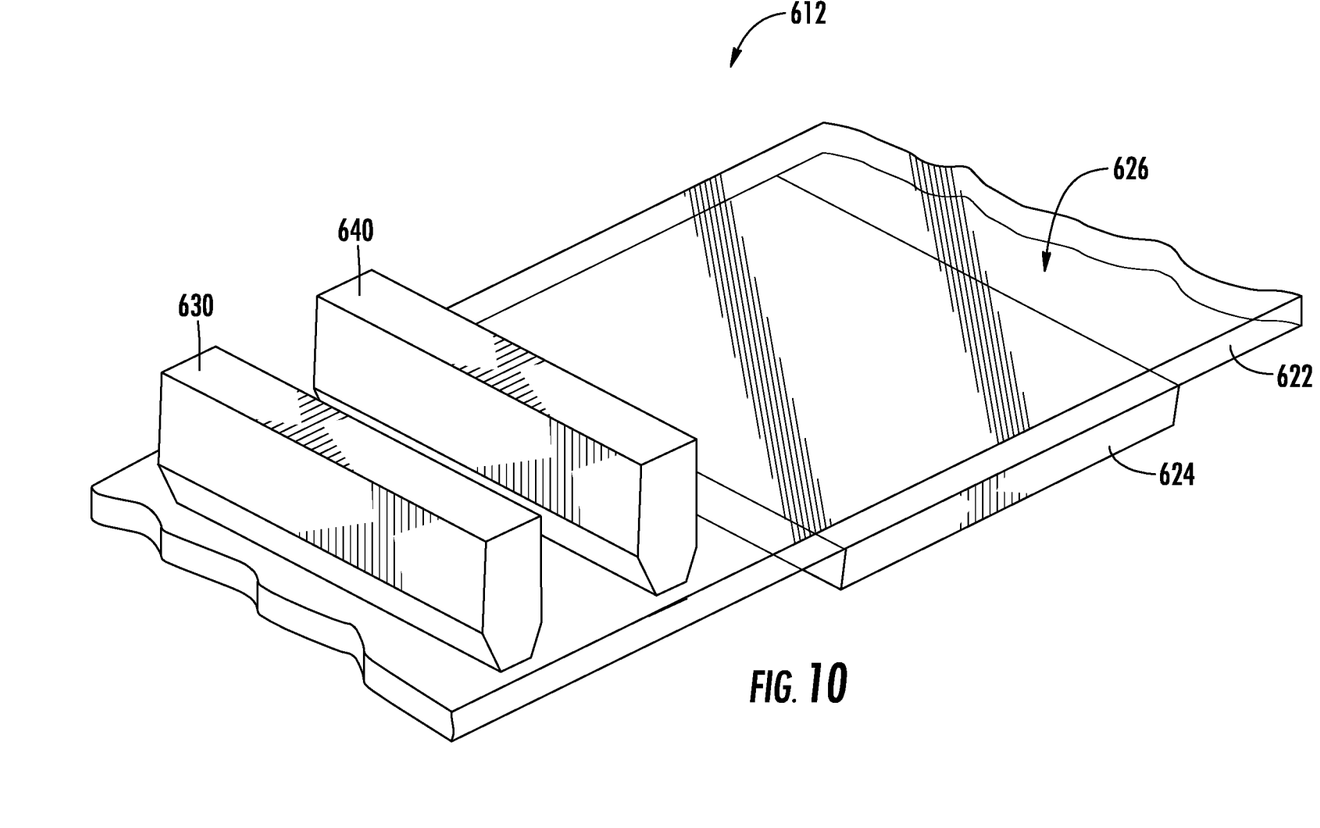
FIG. 10 is a schematic perspective view of an alternative resin handling assembly.

FIG. 10 shows an example of an alternative resin handling assembly 612 which may be used to supply different materials to a build surface at different times during the build or to supply more than one material to different areas on a given build surface. The resin handling assembly 612 may be substituted for any of the resin handling assemblies described above. The resin handling assembly 612 includes a flexible polymeric tape or foil 622, similar to foil 22 described above (alternatively, a plate or tank could be used). A portion of the foil 622 is supported from underneath by a support plate 624. The foil 622 is an example of a "resin support" and defines a build surface 626. The resin handling assembly 612 includes two or more material depositors arranged to deposit resin R optionally with filler onto the build surface 626. In the illustrated example, first and second material depositors 630 and 640 are shown. It will be understood that each material depositor 630 and 640 includes a reservoir for material communicating with a material outlet such as a slot or aperture (not shown). Each material depositor 630 and 640 may be loaded with a different material combination. Optionally, the material depositors 630 and 640 may be configured such that they can deposit material in a selective pattern (e.g., dots, lines, or other arbitrary shapes) rather than in a continuous layer, thus facilitating depositing different materials to different areas on the build surface 626.

In general, the material depositors 630 and 640 would be operated one at a time to dispense resin R and optionally filler onto the build surface 626. In one example, the first material depositor 630 would be used to deposit a first material combination on the build surface 626, which would be cured as described above to produce a first layer. Subsequently, the second material depositor 640 would be used to deposit a second material combination on the build surface 626, which would be cured as described above to produce a subsequent layer. In another example, the first material depositor 630 would be used to deposit a first material combination on the build surface 626, leaving one or more uncoated portions of the build surface 626. The second material depositor 640 would then be used to deposit the second material combination on the uncoated portions the build surface 626. Thus, multiple material combinations would be present for a single layer.

Optionally, means such as actuators (not shown) may be used to move one or both of the material depositor 630, 640 away from the build surface 626 when that material depositor 630, 640 is not actively in use. For example, the material depositor not actively in use may be raised vertically away from the build surface 626, shifted laterally away from the build surface 626, or tilted or pivoted away from the build surface 626.

The resin handling assembly 612 described above may be substituted for any of the resin handling assemblies described above, or used in concert with any of the resin handling assemblies described above. For example, the complete apparatus may include only a single resin handling assembly 612 as shown in FIG. 10, in conjunction with an optional cleaning tank as described herein. Multi-material components may then be constructed by using layers of different material combinations produced by the single resin handling assembly 612. Alternatively, multiple material handling assembly 612 may be provided, each capable of using two or more material combinations.

After the material is deposited, the apparatus 10 (or parts thereof) is configured or positioned to define a selected layer increment relative to one of the build surfaces 26, 126. The first build surface 26 is used here for purposes of explanation. The layer increment is defined by some combination of the thickness to which the resin R is applied and the operation of the stage 16. For example, the stage 16 could be positioned such that the upper surface 17 is just touching the applied resin R, or the stage 16 could be used to compress and displace the resin R to positively define the layer increment. The layer increment affects the speed of the additive manufacturing process and the resolution of the component 42. The layer increment can be variable, with a larger layer increment being used to speed the process in portions of a component 42 not requiring high accuracy, and a smaller layer increment being used where higher accuracy is required, at the expense of process speed.

Once the resin R has been applied and the layer increment defined, the radiant energy apparatus 18 is used to cure a two-dimensional cross-section or layer of the component 42 being built.

Where a projector 48 is used, the projector 48 projects a patterned image representative of the cross-section of the component 42 through the support plate 24 and foil 22 to the resin R. This process is referred to herein as "selective" curing. It will be understood that photopolymers undergo degrees of curing. In many cases, the radiant energy apparatus 18 would not fully cure the resin R. Rather, it would partially cure the resin R enough to "gel" and then a post-cure process (described below) would cure the resin R to whatever completeness it can reach. It will also be understood that, when a multi-layer component is made using this type of resin R, the energy output of the radiant energy apparatus 18 may be carefully selected to partially cure or "under-cure" a previous layer, with the expectation that when the subsequent layer is applied, the energy from that next layer will further the curing of the previous layer. In the process described herein, the term "curing" or "cured" may be used to refer to partially-cured or completely-cured resin R. During the curing process, radiant energy may be supplied to a given layer in multiple steps (e.g. multiple flashes) and also may be supplied in multiple different patterns for a given layer. This allows different amounts of energy to be applied to different parts of a layer.

Once curing of the first layer is complete, the stage 16 is separated from the first build surface 26, for example by raising the stage 16 using the vertical actuator 36. It will be understood that the resin R and/or cured layer do not necessarily join, stick, or bond with the build surface. Accordingly, as used herein the term "separate" refers to the process of moving two elements apart from each other and does not necessarily imply the act of breaking a bond or detaching one element from another.

Subsequent to separation, the first build surface 26 may be cleaned or otherwise rejuvenated and prepared for re-use. For example, advancing the foil 22 provides a clean surface within the first build zone 26. As the foil 22 advances, the material depositor 30 would be used to apply resin R to the build surface 26 to ready it for curing again.

After separation, the component 42 and/or the stage 16 may be cleaned to remove uncured resin R, debris, or contaminants between curing cycles. The cleaning process may be used for the purpose of removing resin R that did not cure or resin R that did not cure enough to gel during the selective curing step described above. For example, it might be desired to clean the component 42 and/or the stage 16 to ensure that no additional material or material contamination is present in the final component 42. For example, cleaning could be done by contacting the component 42 and/or the stage 16 with a cleaning fluid such as a liquid detergent or solvent. FIG. 1 shows one example of how this could be accomplished by providing cleaning fluid 15 in the open-topped cleaning tank 14.

The shifting mechanism would be used to move the stage 16 out of the first build zone 26 and over the cleaning tank 14. The stage 16 would then be lowered to bring the component 42 into contact with the cleaning fluid 15. Upon completion of the cleaning cycle, the stage 16 would then be raised to move the component 42 clear of the cleaning tank 14. Optionally, the cleaning process may include the introduction of some type of relative motion between the cleaning fluid 15 and the component 42.

Figure 6:
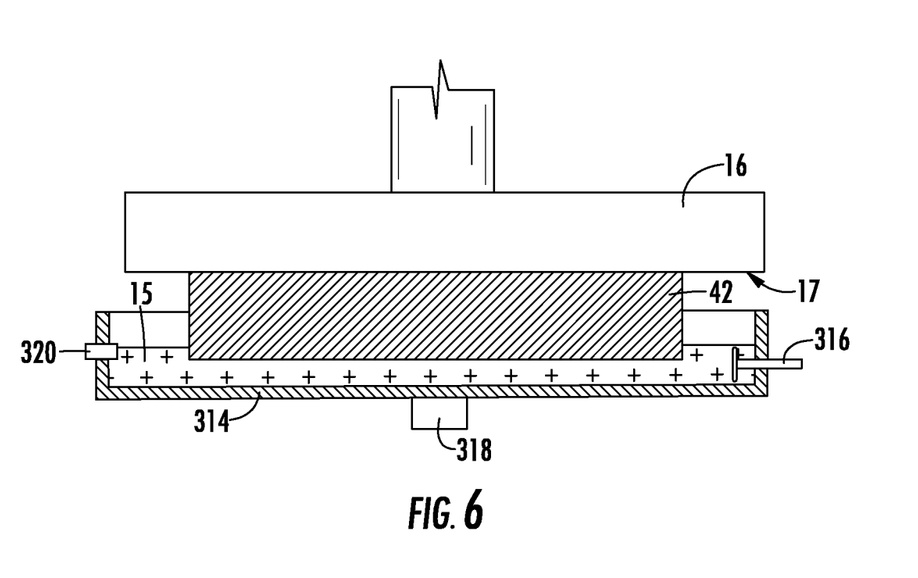
FIG. 6 is a schematic side elevation view of a stage and a cleaning tank containing cleaning fluid.

FIG. 6 illustrates a cleaning tank 314 (generally similar to cleaning tank 14) incorporating several different possible means for producing this relative motion. As one example, a mechanical mixing blade 316 may be used to agitate the cleaning fluid 15. As another example, an ultrasonic transducer 318 coupled to the cleaning tank 314 may be used to produce ultrasonic waves in the cleaning fluid 15. As another example, one or more nozzles 320 may be used to introduce jets of flowing cleaning fluid 15. As yet another example, appropriate actuators (not shown) may be used to produce relative motion of the stage 16 and the cleaning tank 314.

Figure 7:
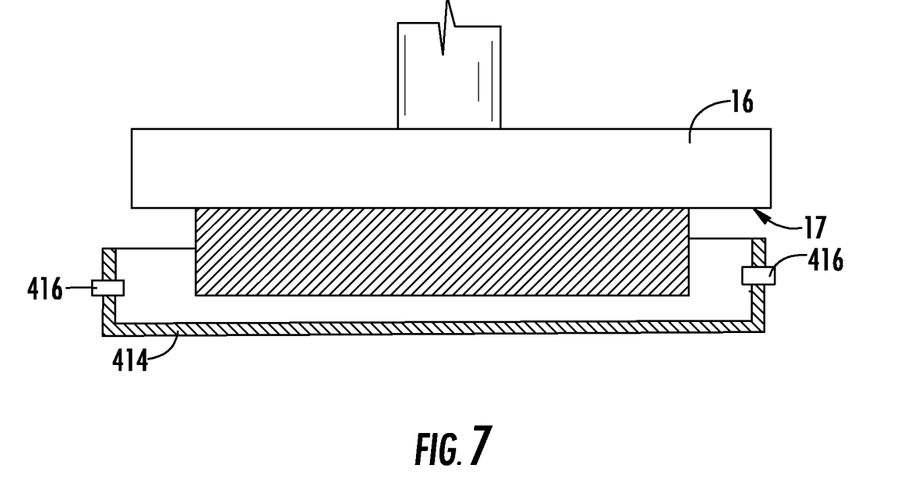
FIG. 7 is a schematic side elevation view of a stage in an empty tank equipped with air nozzles.

Optionally, the cleaning process may include a "drying" step in which the freshly cleaned component 42 is positioned within an empty cleaning tank 414 (FIG. 7) with air nozzles 416 which would be used to direct jets of air at the component 42 for the purpose of blowing off or evaporating the cleaning fluid. Depending on the particular circumstances, the "drying" step may be sufficient to clean the component 42 in and of itself.

Subsequent to the cleaning step, the shifting mechanism would then be used to move the stage 16 into one of the build zones 28, 128. Here, the second build zone 128 is used as an example. It will be understood that any build zone 28, 128 can be used for any layer.

The stage 16 is lowered over the tank 122. The layer increment is defined by some combination of the depth within the tank 122 to which the resin R is filled and the operation of the stage 16. For example, the stage 16 could be positioned such that the upper surface 17 is just touching the applied resin R, or the stage 16 could be used to compress and displace the resin R to positively define the layer increment.

The projector 48 is again used to selectively cure the resin R by projecting a patterned image 56 representative of the cross-section of the component 42, through the floor 124 of the tank 122 to the resin R. Exposure to the radiant energy selectively cures resin R as described above, and joins the new layer to the previously-cured layer.

Once curing of the layer is complete, the stage 16 is separated from the second build surface 126, for example by raising the stage 16 using the vertical actuator 36.

Subsequent to separation, the second build surface 126 may be cleaned or otherwise rejuvenated and prepared for re-use by removing uncured resin R and other debris from the second build surface 126. Non-limiting examples of suitable cleaning processes include brushing, abrading, scraping, vacuuming or blowing, absorbing, wiping, solvent rinsing, or combinations thereof. It will be understood that the process of cleaning or otherwise rejuvenating could be carried out in a remote location away from the apparatus 10. The material depositor 130 could be used to apply resin R to the second build surface 126 to ready it for curing again.

Also, after separation, the component 42 and/or the stage 16 can again be cleaned using the cleaning tank 14 to remove uncured resin R, debris, or contaminants, as described above This cycle of preparing the build surfaces 26, 126, incrementing a layer, selectively curing, separating the component 42 from the build surfaces 26, 126, and cleaning the component 42 and/or stage 16 would be repeated as necessary until the entire component 42 is complete. Within this cycle, the shifting mechanism may be used to move the stage 16 to whichever build zone 28, 128 contains the required material combination needed for the specific layer being cured. The movement of the shifting mechanism may be translational, rotational, or some combination thereof. Furthermore, the movement may be configured to avoid moving the stage 16 over other portions of the apparatus. For example, considering the apparatus 10 depicted in FIG. 1, the stage 16 could be shifted in the Y-direction prior to movement in the X-direction. Where multiple build zones are present, this would permit the stage 16 to be moved from one location to another while not passing over an intermediate build zone. This would avoid contamination of the build zone by resin R, cleaning fluid, or debris dropping from the stage 16 and/or component 42.

Where a scanned beam apparatus is used for the build cycle described above, instead of a projector, the radiant energy source 62 emits a beam 66 and the beam steering apparatus 64 is used to cure the resin R by steering a focal spot of the build beam 66 over the exposed resin R in an appropriate pattern.

Optionally, a scanned beam apparatus may be used in combination with a projector. For example, a scanned beam apparatus may be used to apply radiant energy (in addition to that applied by the projector) by scanning one or multiple beams over the surface of the uncured resin R. This may be concurrent or sequential with the use of the projector.

Either curing method (projector or scanned) results in a component 42 in which the filler (if used) is held in a solid shape by the cured resin R. This component may be usable as an end product for some conditions. Subsequent to the curing step, the component 42 may be removed from the stage 16.

If the end product is intended to be composed of the filler (e.g. purely ceramic, glass, metallic, diamond, silicon, graphite, etc.), the component 42 may be treated to a conventional sintering process to burn out the resin R and to consolidate the ceramic or metallic particles. Optionally, a known infiltration process may be carried out during or after the sintering process, in order to fill voids in the component with a material having a lower melting temperature than the filler. The infiltration process improves component physical properties.

The method described herein has several advantages over the prior art. In particular, it will allow the production of additively manufactured multi-material-layer structures that have desired properties (e.g., mechanical, electric, dielectric, and/or magnetic), such as mixture of electric conductor phase vs insulator phase. It can provide excellent resolution, for example better than +/−0.3 mm (0.001 in). The multi-material combination can be, for example polymer-composite, ceramic-ceramic, metal-metal, or ceramic-metal.

The foregoing has described a method and apparatus for additive manufacturing. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

Further aspects of the invention are provided by the subject matter of the following numbered clauses:

1. A method for producing a component layer-by-layer, comprising: providing two or more resin handling assemblies, each resin handling assembly including a resin support which has at least a portion which is transparent, wherein each resin support defines a build surface located in a build zone of the respective resin handling assembly; executing a build cycle, including the steps of: depositing on each build surface resin which is radiant-energy-curable, wherein the resin on each build surface is a unique material combination; positioning a stage relative to a selected one of the build surfaces so as to define a layer increment in the resin on the selected build surface; selectively curing the resin on the selected build surface using an application of radiant energy in a specific pattern so as to define the geometry of a cross-sectional layer of the component; moving the selected build surface and the stage relatively apart so as to separate the component from the selected build surface; and repeating the cycle, for a plurality of layers, wherein at least one of the layers is cured in each of the build zones, until the component is complete.

2. The method of any preceding clause, further comprising cleaning at least one of the component and the stage.

3. The method of any preceding clause, wherein at least one of the resin supports includes a moveable foil which defines the corresponding build surface.

4. The method of any preceding clause, wherein at least one of the resin supports includes a tank having a floor which defines the corresponding build surface.

5. The method of any preceding clause wherein the step of cleaning includes: providing a cleaning tank containing a cleaning fluid; moving the stage so as to contact at least one of the component and the stage with the cleaning fluid; and moving the stage so as to separate the stage and the component from the cleaning fluid.

6. The method of any preceding clause wherein the step of positioning the stage includes moving the stage into one of the build zones by at least one of translation and rotation.

7. The method of any preceding clause wherein the step of positioning the stage includes moving the resin handling assemblies relative to the stage by at least one of translation and rotation.

8. The method of any preceding clause wherein a single radiant energy apparatus is provided which is moveable between the build zones.

9. The method of any preceding clause wherein a separate radiant energy apparatus is provided for each of the build zones.

10. The method of any preceding clause wherein a single radiant energy apparatus is provided which has a projection footprint, or a range of beam sweep, sufficiently large to cover all of the resin handling assemblies.

11. The method of any preceding clause wherein a single radiant energy apparatus is provided in combination with image shifting means operable to selectively direct radiant energy from the radiant energy apparatus to the resin handling assemblies.

12. The method of any preceding clause wherein the resin includes a particulate material filler.

13. The method of any preceding clause further comprising sintering the component to burn out the cured resin and consolidate the filler.

14. The method of any preceding clause further comprising infiltrating a lower-melting-temperature material into the component during or after sintering.

15. The method of any preceding clause wherein the application of radiant energy is applied by projecting a patterned image comprising a plurality of pixels.

16. The method of any preceding clause wherein the patterned image is shifted during the application of radiant energy.

14. The method of any preceding clause wherein additional radiant energy is applied by scanning at least one build beam over the surface of the resin.

18. The method of claim 1 wherein the radiant energy is applied by scanning a build beam over the surface of the resin.

19. The method of claim 1, further comprising, during the build cycle, depositing two or more unique material combinations onto one of the two or more build surfaces.

20. The method of any preceding clause wherein the two or more unique material combinations are deposited for a single layer of the component.

21. The method of any preceding clause where the two or more unique material combinations are deposited for different layers of the component 22. An additive manufacturing apparatus, comprising: at least two resin handling assemblies, each resin handling assembly including a resin support, wherein each resin support defines a build surface which is located in a build zone of the respective resin handling assembly; a stage positioned adjacent the build zone and configured to hold a stacked arrangement of one or more cured layers of a radiant-energy-curable resin; one or more actuators operable to manipulate a relative position of the build surface and the stage, a shifting mechanism operable to change the relative positions of the stage and the resin handling assemblies; and a radiant energy apparatus positioned adjacent to the build zone opposite to the stage, and operable to generate and project radiant energy in a predetermined pattern.

23. The apparatus of any preceding clause further comprising a cleaning tank containing a cleaning fluid.

24. The apparatus of any preceding clause wherein the shifting mechanism is operable to move the stage relative to the resin handling assemblies and the cleaning tank.

25. The apparatus of any preceding clause wherein the shifting mechanism is operable to move the resin handling assemblies and the tank relative to the stage.

26. The apparatus of any preceding clause wherein a separate radiant energy apparatus is provided for each of the build zones.

27. A method for producing a component layer-by-layer, comprising: providing a resin handling assembly, the resin handling assembly including a resin support which has at least a portion which is transparent, wherein the resin support defines a build surface located in a build zone of the resin handling assembly; providing two or more material depositors operable to deposit a resin which is radiant-energy-curable onto the build surface, wherein each of material depositors is provided with a unique material combination of the resin; executing a build cycle, including the steps of: using a selected one of the two or more material depositors to deposit the corresponding material combination of the resin on the build surface; positioning a stage relative to the build surface so as to define a layer increment in the resin on the build surface;

selectively curing the resin on the build surface using an application of radiant energy in a specific pattern so as to define the geometry of a cross-sectional layer of the component; moving the build surface and the stage relatively apart so as to separate the component from the build surface; and repeating the cycle, for a plurality of layers, wherein each of the two or more material depositors is used to deposit the resin for at least one of the layers, until the component is complete.

28. The method of any preceding clause wherein the two or more unique material combinations are deposited for a single layer of the component.

29. The method of any preceding clause where the two or more unique material combinations are deposited for different layers of the component.

30. An additive manufacturing apparatus, comprising: a resin handling assembly, the resin handling assembly including a resin support, wherein the resin support defines a build surface which is located in a build zone of the resin handling assembly; two or more material depositors operable to deposit a resin which is radiant-energy-curable onto the build surface, wherein each of material depositors is provided with a unique material combination of the resin; a stage positioned adjacent the build zone and configured to hold a stacked arrangement of one or more cured layers of a radiant-energy-curable resin; and one or more actuators operable to manipulate a relative position of the build surface and the stage; and a radiant energy apparatus positioned adjacent to the build zone opposite to the stage, and operable to generate and project radiant energy in a predetermined pattern.

31. The apparatus of any preceding clause further comprising: a cleaning tank containing a cleaning fluid; a shifting mechanism operable to change the relative positions of the stage, the resin handling assembly, and the cleaning tank.

What is claimed is:

1. A method for producing a component layer-by-layer, comprising:
providing two or more resin handling assemblies, each resin handling assembly including a resin support which has at least a portion which is transparent, wherein each resin support defines a build surface located in a build zone of the respective resin handling assembly, and wherein each resin support is a separate foil;

executing a build cycle, including the steps of:
depositing on each build surface resin which is radiant-energy-curable, wherein the resin on each build surface is one or more unique material combinations;
positioning a stage relative to a selected one of the build surfaces so as to define a layer increment in the resin on the selected build surface;
selectively curing the resin on the selected build surface using an application of radiant energy, from a radiant energy apparatus, in a specific pattern so as to define the geometry of a cross-sectional layer of the component;
moving the selected build surface and the stage relatively apart so as to separate the component from the selected build surface;
moving the stage and the radiant energy apparatus to another of the build surface, wherein moving the stage from the selected build surface to the other build surface further comprises moving the stage in a first direction and moving the stage in a second direction transverse to the first direction; and
repeating the cycle, for a plurality of layers, wherein at least one of the layers is cured in each of the build zones, until the component is complete.

2. The method of claim 1, further comprising cleaning at least one of the component and the stage.

3. The method of claim 1, wherein the foil of at least one of the resin supports is a moveable foil which defines the corresponding build surface.

4. The method of claim 2 wherein the step of cleaning includes:
providing a cleaning tank containing a cleaning fluid;
moving the stage so as to contact at least one of the component and the stage with the cleaning fluid; and
moving the stage so as to separate the stage and the component from the cleaning fluid.

5. The method of claim 1 wherein the step of positioning the stage includes moving the stage into one of the build zones by at least one of translation and rotation.

6. The method of claim 1 wherein the radiant energy apparatus is a single radiant energy apparatus.

7. The method of claim 1 wherein the radiant energy apparatus has a projection footprint, or a range of beam sweep, sufficiently large to cover all of the resin handling assemblies.

8. The method of claim 1 wherein the radiant energy apparatus is provided in combination with image shifting means operable to selectively direct radiant energy from the radiant energy apparatus to the resin handling assemblies.

9. The method of claim 1 wherein the resin includes a particulate material filler.

10. The method of claim 9 further comprising sintering the component to burn out the cured resin and consolidate the filler.

11. The method of claim 10 further comprising infiltrating a lower-melting-temperature material into the component during or after sintering.

12. The method of claim 1 wherein the application of radiant energy is applied by projecting a patterned image comprising a plurality of pixels.

13. The method of claim 12 wherein the patterned image is shifted during the application of radiant energy.

14. The method of claim 1 wherein the radiant energy is applied by scanning a build beam across the resin.

15. The method of claim 1, further comprising, during the build cycle, depositing two or more unique material combinations onto one of the two or more build surfaces.

16. The method of claim 15 wherein the two or more unique material combinations are deposited for a single layer of the component.

17. The method of claim 15 where the two or more unique material combinations are deposited for different layers of the component.

18. The method of claim 1, wherein both of the beam and the lower beam are rotatably coupled to the column.

19. The method of claim 1, further comprising moving the stage from the selected build surface to the other build surface without moving the stage over an intermediate build zone positioned between the selected build surface and the other build surface.

* * * * *